United States Patent [19]
Bittleston

[11] Patent Number: 5,745,436
[45] Date of Patent: Apr. 28, 1998

[54] SEMI-DRY MARINE SEISMIC STREAMER CABLE SECTION

[75] Inventor: Simon Hastings Bittleston, Slependen, Norway

[73] Assignee: Geco A.S., Stavanger, Norway

[21] Appl. No.: 750,495

[22] PCT Filed: Jun. 20, 1995

[86] PCT No.: PCT/NO95/00108

§ 371 Date: Dec. 10, 1996

§ 102(e) Date: Dec. 10, 1996

[87] PCT Pub. No.: WO95/35513

PCT Pub. Date: Dec. 28, 1995

[30] Foreign Application Priority Data

Jun. 20, 1994 [NO] Norway ................................ 942357

[51] Int. Cl.⁶ .......................... G01V 1/38; G01V 1/20
[52] U.S. Cl. ..................... 367/20; 367/154; 174/101.5
[58] Field of Search ................. 367/20, 154; 174/101.5

[56] References Cited

U.S. PATENT DOCUMENTS

| | | | |
|---|---|---|---|
| 4,491,939 | 1/1985 | Carpenter | 367/20 |
| 4,809,243 | 2/1989 | Bledsoe et al. | 367/154 |
| 5,089,668 | 2/1992 | Havey | 174/101.5 |
| 5,272,679 | 12/1993 | Carpenter | 367/20 |

Primary Examiner—Ian J. Lobo
Attorney, Agent, or Firm—Keith G.W. Smith

[57] ABSTRACT

A semi-dry marine seismic streamer cable (5) consists of a number of connected streamer cable sections (5a) which each comprises a mechanical jacket (10) surrounding a hollow core (11) enclosing seismic sensor (15) and signal transfer (16) means. Elongated axial stress elements (18) for transmitting axial loads and a radial reinforcement member (12) for relieving radial loads are provided in the jacket (10). The core (11) is filled with a fluid or a fluid-saturated foam and the sensor means (15) are mounted in the core (11) by vibration isolating elements (14).

8 Claims, 2 Drawing Sheets

SEMI-DRY MARINE SEISMIC STREAMER CABLE SECTION

BACKGROUND OF THE INVENTION

The present invention concerns a semi-dry marine seismic streamer cable consisting of a number of streamer cable sections, wherein each streamer cable section comprises a plurality of seismic signal sensor means provided at the center of the cable and forming a detector array, signal transfer means for connecting the array to a signal processing device, a cylindrical mechanical jacket forming the outer portion of the cable and an inner hollow core for enclosing said signal sensor and transmission means.

A seismic streamer is a cable containing an array of hydrophones towed at about 5 knots behind a seismic vessel. The purpose of a streamer is to record acoustic signals usually generated by an air gun and reflected by layers of rock in the earth. The cable is often several thousands of meters long and is towed beneath the sea surface at a depth of about 10 meters. The cable is usually made up of sections with a length of 100 meters. So-called "wet" streamers are constructed with an outer plastic jacket filled with kerosene and containing hydrophone sensors, electronics and mechanical parts. The mechanical items include stress members kept in place by plastic spacers which are placed periodically along the length. The stress members are composed of steel or a man-made fiber like Kevlar. The hydrophone sensors are placed at intervals, typically of the order of one meter (not necessarily uniformly spaced), and the measurements communicated along the cable to the vessel through a bundle of wires. Sometimes signals are electronically digitized inside the streamer.

Other types of streamer have been invented, e.g. solid ("dry") streamer cables. In these the core of the streamer is not filled with kerosene, but with some light weight plastic or composite material.

Both wet and dry streamers need to be neutrally buoyant, something which is achieved by removing or adding kerosene, or by adding weights. This balancing must be repeated each time a new location is surveyed. This is because the density of the sea water changes in different parts of the world due to variations in its temperature and salinity.

There are several problems with wet streamers. The plastic skin may become punctured from shark bites or by smashing into submerged objects. The invasion of sea water short-circuits the electronics causing a failure of the system. If this happens the section is usually returned to the factory for repair.

Wet streamers are affected by bulge waves. These are waves which travel along the skin and induce radial pressure vibrations which propagate through the kerosene to the hydrophones. Bulge waves are often generated at connectors or at spacers both of which can act as pistons. Bulge waves appear as noise on the seismic signal.

The failure of any internal part of a wet streamer means it must be returned to the factory, the skin removed and the repair made. For both wet and dry streamers the electrical and mechanical parts are physically interleaved, i.e. for wet streamers the electronics can not be easily separated from the spacers and stress members.

Dry streamers also have drawbacks. One is the balancing the streamer. As discussed earlier, each new survey site requires a rebalancing of the cable. Hence the streamer, with, no weights attached, must be less dense than any sea water it might encounter during its life. Lead weights are often attached to the surface of the streamer using tape or are clipped on. This locally increases the diameter of the streamer. The turbulent flow over the surface is perturbed and eddies may be shed leading to an increase in the surface noise. This reduces the signal to noise ratio at the hydrophones reducing the equality of the recording.

Solid streamers are more difficult to repair. Generally the plastic body must be dissected, the repair made and new plastic molded into place. This again requires the return of the streamer to the maufacturing center.

In order to improve the mechanical and acoustic properties of seismic streamers, U.S. Pat. No. 4,809,243 proposes a streamer cable with an outer jacket enclosing an open-cell foam case with an axial hole for retaining the pressure sensors. Longitudinal channels along the exterior of the foam core and inside the jacket receive stress members giving longitudinal rigidity to the streamer. Cable noise associated with jerks and vibration is reduced both by the foam core and the stress member.

It is predicted that dry streamers transmit more flow noise to the hydrophones than wet streamers (S. H. Francis, M. Slazak and J. G. Berryman. Response of elastic cylinders to convective flow noise. Homogeneous, layered cylinders. J. Accoust. Soc. Am. 75(1), January 1984, pp. 166–172). Shear waves are induced by the turbulent flow over the surface. These waves can propagate through a solid plastic material whilst they are soon suppressed when propagating through a fluid. Also in a dry streamer, vibrations due to the heave of the vessel and other causes, can propagate along the stress members, through the plastic as elastic waves and to the hydrophones. Pressure fluctuations by this method also may deteriorate the seismic signal.

It is the object of this invention to provide an instrumented marine seismic streamer cable of substantially neutral buoyancy with modular mechanical and sensor/electrical components. It is another object of this invention to provide a seismic streamer cable which inherently resists skin failure, avoids shear wave propagation to the hydrophones, isolates the hydrophones from vibration and eliminates bulge waves. It is yet another object of this invention to provide a streamer cable in which the mechanical and electrical modules can be separated easily. It is a further object of this invention to provide a streamer cable which can be balanced by the addition and removal of fluid.

SUMMARY OF THE INVENTION

The above-mentioned objects are achieved with a seismic streamer cable according to the present invention and being characterized in that the jacket contains axial stress members embedded in said jacket for transmitting axial loads, and a radial reinforcement member for relieving radial loads and likewise embedded in the jacket, said reinforcement member either surrounding the stress member or being enclosed by the latter.

Further features and advantages of the seismic streamer cable according to the invention are given in the attached dependent claims.

The streamer cable section according to the invention shall now be described in greater detail by means of a non-limiting example of a preferred embodiment with reference to the drawings.

DESCRIPTION OF THE PREFERRED EMBODIMENTS

Figure 1:
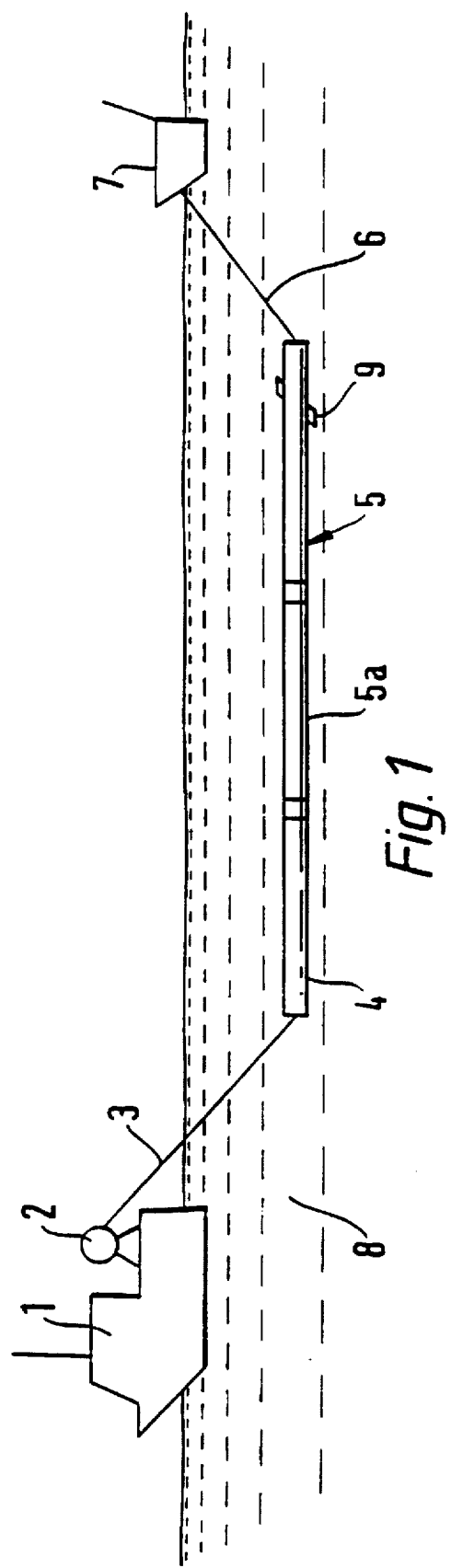
FIG. 1 illustrates a seismic vessel towing the marine seismic streamer cable of the present invention through a body of water.

FIG. 1 shows a seismic exploration vessel 1 towing a long instrumented marine streamer cable 5 through a body of water 8 beneath the surface thereof. The cable is secured to the vessel by a lead-in cable 3 and possibly one or more vibration isolating cables 4, usually known as stretch sections. The lead-in cable passes onto a winding drum 2. The end of the streamer is attached to a tail buoy 7 by a rope 6. Many depth controllers or birds 9 maintain the streamer cable at a constant prescribed depth. The streamer cable 5 is made up of a number of streamer cable sections 5a.

The streamer cable is cylindrical and contains at its center hydrophones distributed along its length. Pressure pulses are reflected from the layers of rock in the earth, and pressure waves are generated from other places too, and propagate to the hydrophones. The hydrophones convert these pulses into electrical or optical signals and the signals are transmitted to the vessel along copper wires, optical fibers or by another telemetry method. Either within the vessel or within the streamer, the signals are digitized. They are recorded onto permanent media on the vessel, e.g. onto hard disks.

Figure 2:
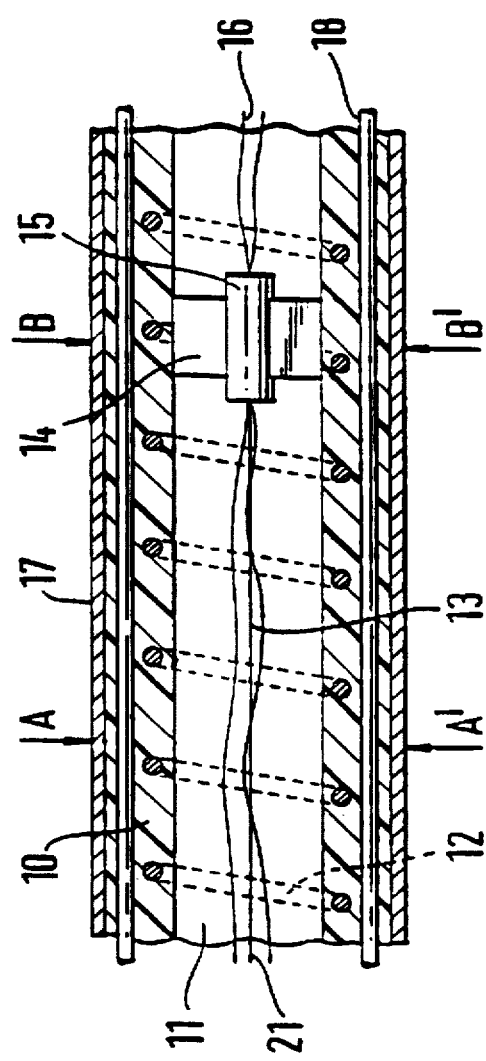
FIG. 2 is an enlarged isometric view of a portion of a streamer cable section.

FIG. 2 shows a side view of a portion of the cable section 5a. There are two separate regions: an outer mechanical jacket 10, and an inner core 11 which contains sensors 15 and wires 16. The outer jacket includes one or more stress members 18, which transmit axial loads. The stress members are embedded in the material of the jacket which could be, for example, polyurethane. The mechanical jacket is also reinforced to resist radial forces. By way of illustration, this is shown as a strong plastic spiral 12. Stress members 18 could be placed either inside or outside the spiral 12. The polyurethane embedding the stress members will also surround the spiral. There are other ways in which the mechanical jacket could be reinforced, one of which may be to periodically change to constituents and properties of the embedding plastic.

Inside the mechanical jacket 10 is a fluid core 11. The fluid envelops the hydrophone sensors 15 and the bundle of wires 16. Each hydrophone is held on vibration isolating elements 14. The inner core 11 may be removed and replaced by drawing it out at one end of the streamer cable section 5d. To achieve this a pull cord 21 is included in the core 11. A second purpose of the pull cord is to keep the hydrophones 14 in the correct axial position.

There may also be an extra outer layer of plastic 17 surrounding the streamer. This layer can have different properties to the other materials making up the mechanical jacket, e.g. greater hardness.

Figure 3:
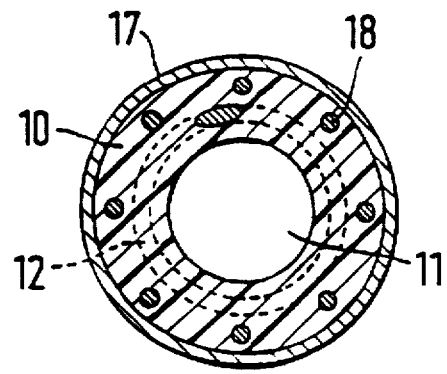
FIG. 3 is a cross-sectional view of FIG. 2 along the line A-A'.

FIG. 3 shows a cross section of the streamer cable section 5a at position AA'. The stress members 18 are shown to be circular although shaped members could also be used. The outer mechanical jacket 10 and inner core 11 are manufactured separately. The outer mechanical jacket may be produced by a co-extrusion process with a partly rotating extrusion head to provide the spiral reinforcement 12. The extrusion head would have holes for the stress members which would be under some tension during extrusion. The embedding plastic may contain glass microspheres (microballoons) to reduce its density. Alternatively, the outer jacket may be produced by a two-pass extrusion process. In the first pass the spiral would be formed whilst in the second the remaining parts would be coextruded on top of this. The exact configuration will depend on the telemetry system used. It has been stated that the rest of the core is filled with fluid. An alternative embodiment of the invention is to put an open cell foam into this space and to saturate the foam with fluid.

Figure 4:
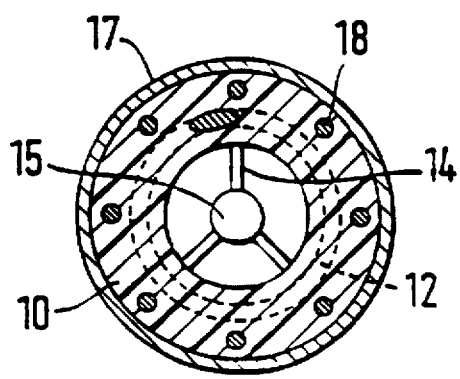
FIG. 4 is a cross-sectional view of FIG. 2 along the line BB'.

FIG. 4 is a cross section of FIG. 2 at position BB'. At this position a hydrophone 15 is held in place at the center by vibration isolating elements 14. The elements are in the form of arms to keep the hydrophone in position. For illustrative purposes three arms are shown. The arms do not have any structural strength beyond that necessary to hold the weight of the hydrophones and the cable bundle. The arms are made of flexible rubber or plastic, optimized to suppress vibrations being transmitted from the mechanical jacket to the hydrophone. Any type of hydrophone can be used.

Figure 5:
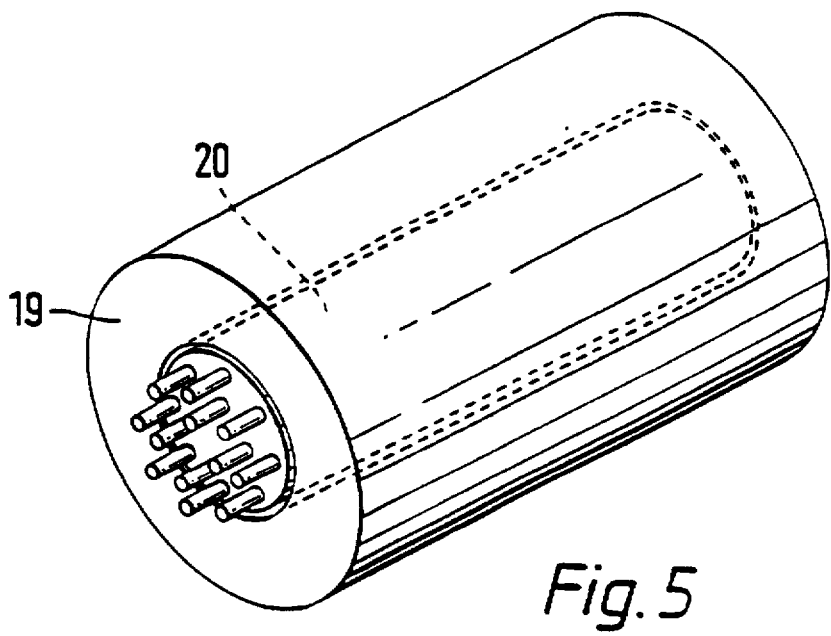
FIG. 5 is an enlarged isometric view of an end connector.

FIG. 5 is an isometric view of an end connector for a section of the streamer. The end connector is also divide two parts—an outer load bearing annulus 19 and an inner core 20 which couples the telemetry system. The two parts of the connector can be separated to allow the inner core of the streamer to be withdrawn. The mechanical coupling between the connector annulus and core is designed to avoid the transfer of axial vibrations between these two parts.

The streamer is significantly different to previous inventions in being modular. Previously no clear separation of the mechanical and sensor/telemetry functions has been made. The streamer is also specifically designed to allow vibration isolation of the hydrophones. It maintains the advantages of wet streamers in being easily balanced and in stopping shear waves propagating to the hydrophones. It also keeps the advantages of a dry cable in that the mechanical jacket will resist external attacks. Maintenance has been addressed by the ability to withdraw the central core and the design is amenable to a rapid manufacturing process.

The above disclosure has been given of a preferred embodiment in order to disclose a best mode of construction. It is evident that a person skilled in the art may recognize alternative physical arrangements or manufacturing methods that may be used. The embodiment has been disclosed with a hydrophone array, but other sensors and telemetry systems may be employed in conjunction with a physical layout of the streamer section as disclosed. All such variations that are construed within the scope and spirit of the present invention should only be regarded as limited by the appended claims.

I claim:

1. A semi-dry seismic streamer cable comprising a number of connected streamer cable sections, wherein each streamer cable section comprises a plurality of seismic signal sensor means provided at the center of the cable and forming a detector array, signal transmission means for connecting the array to a signal processing device, and an extruded cylindrical mechanical jacket forming the outer portion of the cable and an inner hollow core for enclosing said signal sensor and transmission means, and wherein the jacket contains axial stress members embedded in said jacket during extrusion thereof for transmitting axial loads, and a radial reinforcement member for relieving radial loads and likewise embedded in the jacket during extrusion thereof, said reinforcement member either surrounding the axial stress members or being enclosed by the latter.

2. A streamer cable according to claim 1, wherein the radial reinforcement member is formed by a helical member wound around the core and extending between end connectors of a streamer cable section.

3. A streamer cable according to claim 2, wherein the helical member is formed by a spiral of plastic material.

4. A streamer cable according to claim 1, wherein the jacket is surrounded by an adjacent outer thin annular layer.

5. A streamer cable according to claim 4, wherein both the jacket and the layer are formed of plastic material.

6. A streamer cable according to claim 1, wherein the sensor means are mounted in the core by means of vibration isolating elements provided between said sensor means and the jacket.

7. A streamer cable according to claim 2, wherein the end connector forms a two-part end termination of a streamer cable section, the first part being an outer annulus for transferring axial loads between connected streamer cable sections and the second part being an inner core forming a signal connector for transmitting the signal detected by the seismic sensor means, the first part and the second part being separable.

8. A streamer cable according to claim 1, wherein the free volume of the core is filled with a fluid or an open cell foam material saturated with fluid.

* * * * *